US011882414B2

(12) United States Patent
Gautama

(10) Patent No.: US 11,882,414 B2
(45) Date of Patent: Jan. 23, 2024

(54) AUDIO PLAYBACK SYSTEM FAULT DETECTION METHOD AND APPARATUS

(71) Applicant: NXP B.V., Eindhoven (NL)

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/660,380

(22) Filed: Apr. 22, 2022

(65) Prior Publication Data

US 2022/0369055 A1 Nov. 17, 2022

(30) Foreign Application Priority Data

Apr. 28, 2021 (EP) .................................... 21171011

(51) Int. Cl.
*H04R 29/00* (2006.01)
*H04R 3/04* (2006.01)

(52) U.S. Cl.
CPC ............. *H04R 29/001* (2013.01); *H04R 3/04* (2013.01)

(58) Field of Classification Search
None
See application file for complete search history.

(56) References Cited

U.S. PATENT DOCUMENTS

| | | | |
|---|---|---|---|
| 7,813,514 | B2 | 10/2010 | Asada |
| 9,363,386 | B2 | 6/2016 | Li et al. |
| 9,674,593 | B2 | 6/2017 | Gautama et al. |
| 2006/0251265 | A1 | 11/2006 | Asada |
| 2013/0166227 | A1 | 6/2013 | Hermann et al. |
| 2018/0343531 | A1 | 11/2018 | Nomoto et al. |
| 2020/0401365 | A1 | 12/2020 | Wilberding et al. |

FOREIGN PATENT DOCUMENTS

| | | | |
|---|---|---|---|
| EP | 2642769 | B1 | 12/2017 |

OTHER PUBLICATIONS

Vanhoenacker, Kenneth et al.; "Designof Multisine Excitations to Characterize the Nonlinear Distortions During FRF-Measurements"; IEEE Trans. on Instrumentation and Measurement, vol. 5, No. 5; 6 pages (Oct. 2001).

*Primary Examiner* — James K Mooney

(57) ABSTRACT

There is disclosed an audio playback system including a loudspeaker, a microphone and a means for implementing a method of detecting a fault which includes the generation and analysis of a specific ultrasound reference signal. The presence of the ultrasound reference signal can be detected on the microphone signal, and the signal-to-noise ratio can be estimated during the reference signal playback so that the volume of the reference signal can be adapted if necessary. The reference signal is a multi-sinusoidal signal which, when averaged over time increases the expected signal-to-noise ratio, and hence, the power of the detector.

18 Claims, 6 Drawing Sheets

100

150

200

300

400

450

500

AUDIO PLAYBACK SYSTEM FAULT DETECTION METHOD AND APPARATUS

CROSS-REFERENCE TO RELATED APPLICATIONS

This application claims the priority under 35 U.S.C. § 119 of European patent application no. 21171011.6, filed Apr. 28, 2021, the contents of which are incorporated by reference herein.

FIELD

This disclosure relates to a method and apparatus for detecting a fault in an audio playback system.

BACKGROUND

In many audio systems, it may be desirable to measure whether a loudspeaker is present and functional, to detect faults in the system. Fault detection may be used so that processing can be adjusted for example if one of many loudspeakers is broken. Alternatively or in addition, fault detection may help to ensure that audio warning signals can effectively be communicated to the user such as for a vehicle where warning chimes need to be played to notify the driver. For safety-critical systems in the car or other vehicle or any other system where audio plays a safety-critical role, user notification can be very important. Consequently, determining audio system functionality before sending out the notification may lead to safer systems.

EP 2642769 B1 tests the presence of a loudspeaker by measuring the voltage across and the current flowing into the loudspeaker voice coil. This requires additional hardware for sensing the voice coil current such that the impedance can be estimated. Furthermore, such an approach using test signals in the ultrasound region (such that they are inaudible) would face many practical difficulties. For instance, the impedance in this frequency region does not convey information regarding the functionality of the loudspeaker as it is dominated by the blocked electrical impedance. Consequently, if the loudspeaker has a mechanical failure, the blocked electrical impedance would still be intact, but the resonance peak, that is dominated by the mechanical properties, would be absent. For micro-speakers this resonance peak is typically below around 1 KHz, and for automotive speakers, the resonance peak is typically below 150 Hz. The absence of the resonance peak cannot be measured in the ultrasound frequency region.

U.S. Pat. No. 9,674,593 describes a system using ultrasound signals to monitor the displacement of the loudspeaker diaphragm, which can give a clear indication that the loudspeaker is functioning properly. The loudspeaker diaphragm displacement changes the inductance of the loudspeaker, which can be measured using an inaudible reference signal in the ultrasound region (around 20 kHz). The reference signal is then mixed in with the audio signal. However, when only the reference signal is present (and no audio signal), the diaphragm displacement is extremely small even though there is still acoustic output, and the effect is very difficult to measure. Therefore, this approach cannot be used for continuously monitoring the audio system functionality.

SUMMARY

Various aspects of the disclosure are defined in the accompanying claims. In a first aspect there is provided a method of detecting a fault in an audio playback system, the method comprising: generating a reference signal comprising a plurality of sinusoidal waveforms with frequencies in the ultrasound region for output via the audio playback system as a non-audible reference signal; receiving an audio signal via at least one sensor; determining a presence of the reference signal in the received audio signal; and outputting a fault indication dependent on the signal level.

In one or more embodiments, the method may further comprise outputting a fault indication in response the reference signal not being present in the received audio signal.

In one or more embodiments, each waveform of the plurality of sinusoidal waveforms has a frequency in the range of 19 KHz to 96 KHz.

In one or more embodiments, determining the presence level of the reference signal may include determining a signal-to-noise ratio value of the reference signal and comparing the signal-to-noise ratio to a threshold value.

In one or more embodiments, the amplitude of the generated reference signal may be varied as a function of the signal-to-noise ratio value.

In one or more embodiments, the amplitude of the generated reference signal may increase if the signal-to-noise ratio value is below a first threshold value, and the amplitude of the generated reference signal may decrease if the signal-to-noise ratio value is above one of the first threshold value and a second threshold value.

In one or more embodiments, generating the reference signal includes repeating an N-samples segment, the generation of the N-samples segment may comprise the steps of: defining a set of frequency bins between a first and second ultrasound frequency; defining a magnitude spectrum of length N/2+1, the magnitude spectrum comprising a plurality of active bins having a magnitude greater than zero and a plurality of zero-bins having a magnitude equal to zero; converting the magnitude spectrum to a complex-valued spectrum by adding a phase value to each magnitude value of the active bins; generating the N-samples segment of the reference signal by applying an N-points inverse fast Fourier transform (iFFT) to the complex-valued spectrum.

In one or more embodiments, determining the presence level of the reference signal in the received signal may comprise the steps of: determining the fast Fourier transform (FFT) of an N-samples segment of the received signal; and determining the signal-to-noise ratio value from the ratio of the signal power of the active frequency bins and the signal power of the zero-bins.

In one or more embodiments, generating the N-samples segment of the received signal may comprise the steps of: dividing the received signal into segments of N consecutive samples; averaging across the segments to obtain an N-samples segment.

In one or more embodiments, the amplitudes of the plurality of sinusoidal waveforms are approximately equal.

In one or more embodiments, the method may further comprise mixing the reference signal with an audio signal for output via the loudspeaker.

In a second aspect there is provided a non-transitory computer readable media comprising a computer program comprising computer executable instructions which, when executed by a computer, causes the computer to perform the method of detecting a fault in an audio playback system, the method comprising: generating an reference signal comprising a plurality of sinusoidal waveforms with frequencies in the ultrasound region for output via the audio playback system as a non-audible reference signal; receiving an audio signal via a sensor; determining a received presence level of the reference signal in the audio signal; and outputting a fault indication dependent on the presence level.

In a third aspect, there is provided an audio playback system comprising a reference signal generator having a reference signal output configured to be coupled to a loudspeaker; an audio analyser having an audio analyser input configured to be coupled to an acoustic sensor and an audio analyser output; wherein the reference signal generator is configured to output a reference signal comprising a plurality of sinusoidal waveforms in ultrasound frequency range for output via the loudspeaker; and the audio analyser is configured to: receive an audio input signal; determine a presence level of the reference signal in the received audio input signal; and output a loudspeaker connection fault indication dependent on the presence level.

In one or more embodiments, the audio analyser may be further configured to determine the presence level of the reference signal in the received audio signal by determining a signal-to-noise ratio value of the reference signal for a first sample segment.

In one or more embodiments, the audio analyser may be further configured to determine the presence level of the reference signal by determining a further signal-to-noise ratio value of the reference signal from a further sample segment and determining an average signal-to-noise ratio value from the signal-to-noise ratio value and the further signal-to-noise ratio value.

In one or more embodiments, the audio playback system may further comprise a controller having a controller input coupled to a second audio analyser output and a controller output coupled to a reference signal generator input, wherein the controller is configured to control the reference signal generator to adjust the amplitude of the reference signal dependent on at least one of the signal-to-noise ratio value and the further signal-to-noise ratio value.

In one or more embodiments, the controller may be further configured to control the reference signal generator to increase the amplitude of the generated reference signal if the signal-to-noise ratio value is below a first threshold value, and decrease the amplitude of the generated reference signal if the signal-to-noise ratio value is above one of the first threshold value and a second threshold value.

In one or more embodiments, the reference signal generator may be further configured to generate the reference signal by repeating an N-samples segment, and to generate the N-samples segment by: defining a set of frequency bins between a first and second ultrasound frequency; defining a magnitude spectrum of length N/2+1, the magnitude spectrum comprising a plurality of active bins having an magnitude greater than zero and a plurality of zero bins having an magnitude equal to zero; converting the magnitude spectrum to a complex-valued spectrum by adding a phase value to each magnitude value of the active bins; generating the N-samples segment of the reference signal by applying an N-points iFFT to the complex-valued spectrum.

In one or more embodiments, the audio analyser may be configured to determine a signal level of the reference signal by: determining the FFT of an N-samples segment of the received signal; determining the signal-to-noise ratio value from the ratio of the signal power of the active frequency bins and the signal power of the zero-bins.

In one or more embodiments, the audio analyser may be further configured to generate the N-samples segment of the received signal by: dividing the received signal into segments of N consecutive samples; averaging across the segments to obtain an N-samples segment.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
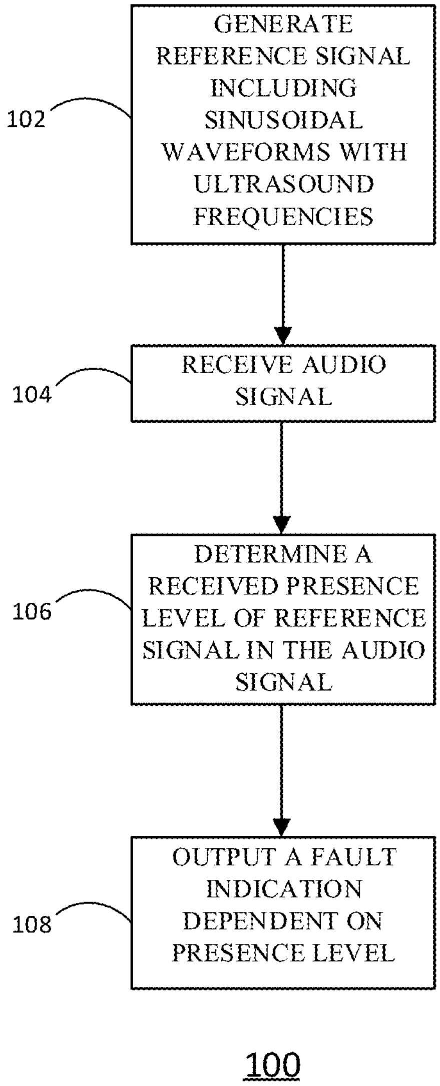
FIG. 1 shows a method of detecting an audio playback system fault according to an embodiment.

FIG. 1 shows a method 100 of detecting a fault in an audio playback system according to an embodiment. In step 102 a reference signal may be generated including a number of sinusoidal waveforms with frequencies in the ultrasound region. The ultrasound region may include frequencies in the range of 19 kHz to 96 kHz. The generated reference signal may be output via a loudspeaker when the audio playback system is functioning normally, for example when playing audio content such as speech or music. In step 104 an audio signal may be received via microphone or other sensor such as an accelerometer or other sensor capable of detecting vibration. In some examples, multiple sensors may be used to receive the audio signal. This audio signal may include background or ambient noise together with the reference signal. The audio signal may also include a wanted audio playback signal mixed with the reference signal which is output via the loudspeaker when the system is functioning normally. In step 106, a presence level of the reference signal within the audio signal may be determined. This presence level may be determined for example by calculating the signal-to-noise ratio based on the knowledge of the characteristics of the reference signal. In other examples, the presence level may be determined from the magnitude of the frequencies determined in the audio signal which correspond to the frequencies of the sinusoidal waveforms in the reference signal. In step 108, the method may output a fault indication depending on the determined presence level of the reference signal within the received audio signal.

The inventor of the present disclosure has appreciated that by using a multi-sine signal (i.e., a signal including a number of sinusoidal waveforms), a fault in the audio playback system may be reliably detected. A multi-sine signal is typically used for (non-) linear system identification. Furthermore, because the signal is inaudible, the method may be used to continuously detect whether or not there is a fault. This fault may be due to example a faulty connection to a loudspeaker, a fault in an amplifier driving the loudspeaker, or some other fault in the audio playback system which prevents the reference signal being transmitted.

Figure 2:
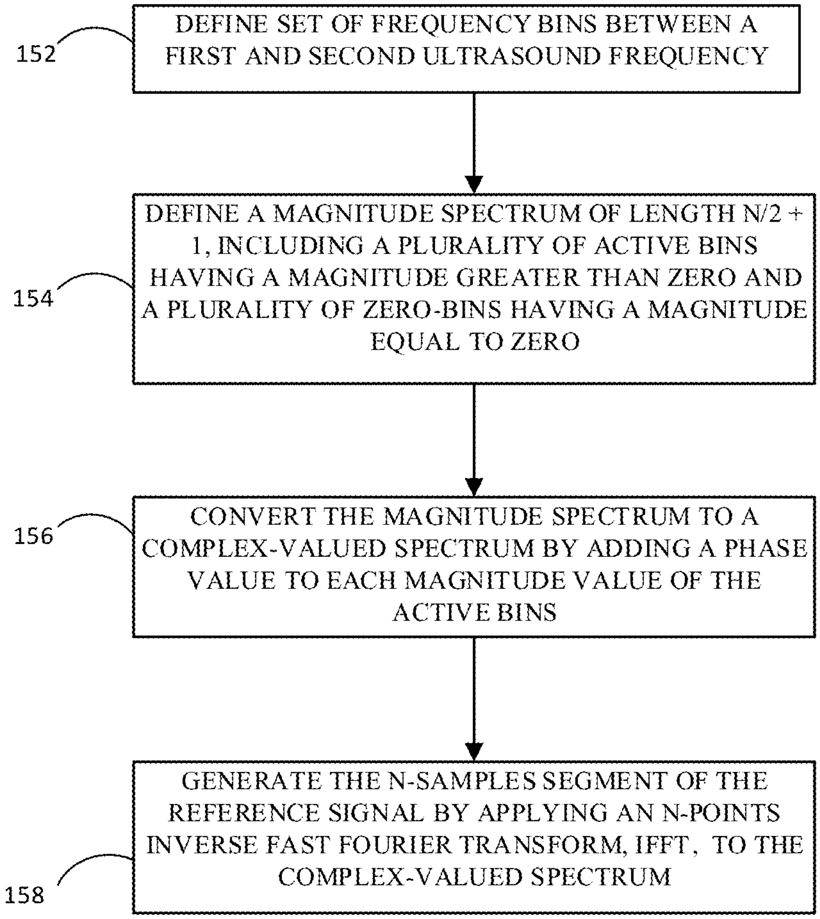
FIG. 2 illustrates a method of generating a reference signal for use in the method of FIG. 1.

An example method 150 for generating a multi-sine signal in the frequency domain is shown in FIG. 2. In step 152 a set of frequency bins may be defined between a first ultrasound frequency and a second ultrasound frequency. In step 154 a magnitude spectrum may be defined of length N/2+1 including a plurality of active bins. Each of the active bins has a magnitude greater than zero. The magnitude spectrum also includes a plurality of zero-bins having a magnitude equal to 0. In some examples, the magnitude of the active bins may be equal. In step 156, the magnitude spectrum may be converted to a complex-valued spectrum by adding a phase value to each magnitude value of the active bins. In step 158 the N-sample segment of the reference signal may be generated by applying an N-points inverse Fast Fourier Transform (iFFT) to the N-points conjugate symmetric complex-valued spectrum that is obtained by extending the (N/2+1) complex-valued spectrum.

This generated signal can be repeated a number of times in accordance with the FFT assumption of periodicity. The reference signal can be passed through a system, and the response can be used to analyse the linear frequency response function (FRF) and the distortion components. For the generated multi-sine signal, when the response is analysed using an N-points FFT, the zero-bins should still be zero in the absence of noise and distortions. If the positions of the zero-bins are appropriately chosen, two subsets of frequency bins will contain odd and even harmonic distortion components.

Figure 3:
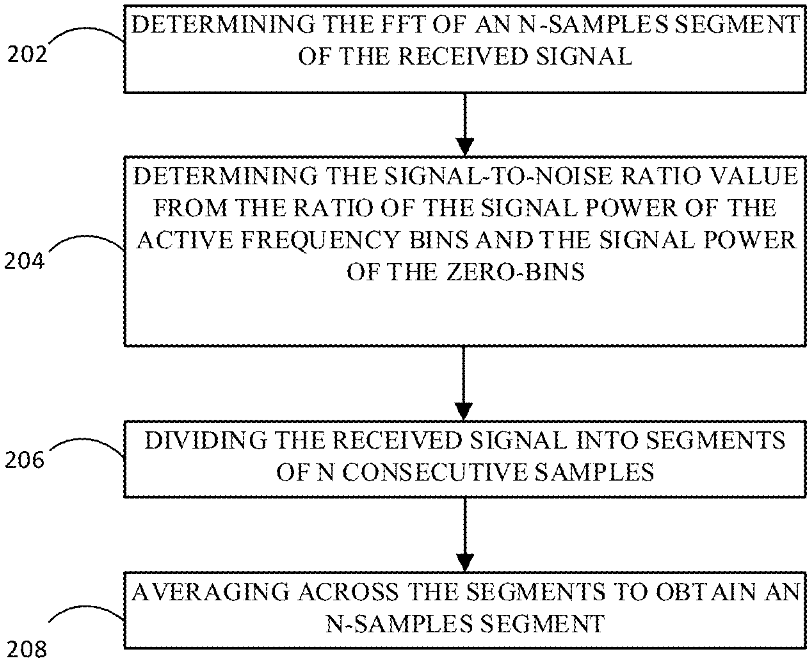
FIG. 3 Shows a method of analysing a detected signal for use in the method of FIG. 1.

FIG. 3 shows an example method 200 for analysing the received signal which may be generated using the method 150. Method 200 may for example be used in step 106 of method 100. The received signal will comprise an echo of the reference signal if the audio system is functional. The presence level of the reference signal within the received signal may be computed as a signal-to-noise-ratio (SNR). In step 202 the FFT of an N-sample segment of the received signal may be determined resulting in a number (N/2+1) of frequency bins denoted $X_i$ In this example only one half of the spectrum is used, since it is conjugate symmetric. In step 204 the signal-to-noise ratio (SNR) value of the reference signal may be determined from the ratio of the mean signal power of the active bins and the mean signal power of the zero-bins. In one example, the SNR may be determined according to equation (1):

$$SNR = 10\log_{10}\frac{N_Z\sum_{i\in A_1}|X_i|^2}{N_{A_1}\sum_{j\in Z}|X_j|^2}, \tag{1}$$

where $N_{A_1}$ and $N_Z$ are the number of bins in the active set $A_1$ and Z, respectively. The detection of the reference signal does not use a cross-correlation, which is the usual way of detecting the presence of a signal.

In step 206 the received signal may be divided into segments of N consecutive samples. In step 208 the determined signal-to-noise ratio value may be averaged across the segments to obtain an N samples segment. The inventor of the present disclosure has further appreciated that by averaging segments of N samples, i.e., dividing a time segment into smaller chunks of N samples and averaging the smaller segments, has a positive effect on the SNR measure. This is because the reference signal and its echo in the received signal are by design periodic over N samples (a segment of N samples is repeated). The phase of the reference signal and, because of linearity, also of the echo, is the same across different repetitions. Therefore, averaging several segments will not substantially decrease the resulting magnitude of the active bins. The other bins, on the other hand, will not have identical phases across repetitions, due to which the averaging operation will decrease the amplitude. Each bin is complex-valued, and averaging complex-valued numbers with identical magnitudes but different phases will decrease the magnitude, whereas the magnitude remains the same if the phases are identical (as is the case in the echo of the reference signal in the active bins).

Figure 4:
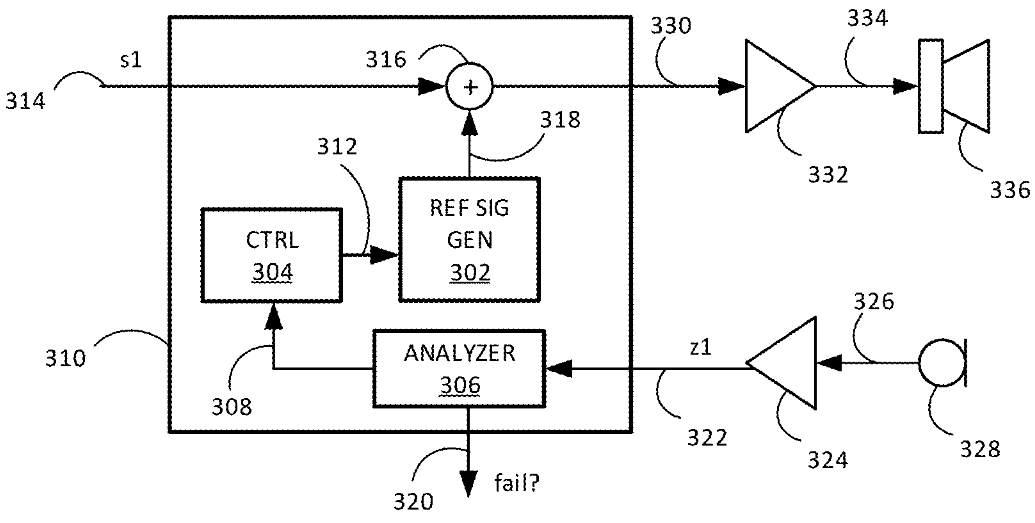
FIG. 4 illustrates an audio playback system according to an embodiment.

FIG. 4 shows an audio system 300 including an audio playback system 310 according to an embodiment. The audio playback system 310 may implement method 100. The audio playback system 310 includes a reference signal generator 302, a controller 304, an analyser 306, and a mixer 316. The audio playback system 310 may have an audio input 314 to receive a wanted audio signal Si connected to a first input of the mixer 316. The reference signal generator may have an output 318 connected to the second input of the audio mixer 316. The audio mixer output 330 is connected to the output of the audio playback system 310.

The analyser 306 may have an input 322 for receiving a signal Z1. The analyser 306 may have a first output 308 connected to an input of the controller 304. Analyser 306 may have a pass/fail indicator output 320.

In operation, the audio mixer output 330 may be connected to an input of a speaker amplifier 332. The speaker amplifier output 334 may be connected to a speaker 336 (sometimes referred to as "loudspeaker 336"). In operation, a microphone 328 may have an output 326 connected to an input of microphone amplifier 324. The microphone amplifier output may be connected to the analyser input 322. An audio signal s1 may be provided at the input, and a reference multi-sine ultrasound signal with a certain gain (gain1) may be output by reference signal generator 302 for example using method 150 and linearly added to the audio signal s1 by the mixer 316. The combined signal is sent to the speaker amplifier 332 and loudspeaker 336. The acoustical output from the speaker 336 together with any ambient noise is recorded using a microphone 328 which outputs microphone signal z1. This microphone signal z1 may be analysed by analyser 306 for example using method 200 and an audio system status (i.e., ok or failure), is indicated at the pass/fail indicator output 320. The output of the analysis is input to a control block, which controls the reference signal generator 302 to generate the reference signal. The controller 304 may for example control the reference signal generator 302 to adapt the gain of the reference signal depending on the signal-to-noise-ratio determined by the analyser 306.

The audio playback system 300 may be implemented in hardware or a combination of hardware and software for example software executed by a microprocessor, microcontroller or other processor such as a digital signal processor.

Figure 5:
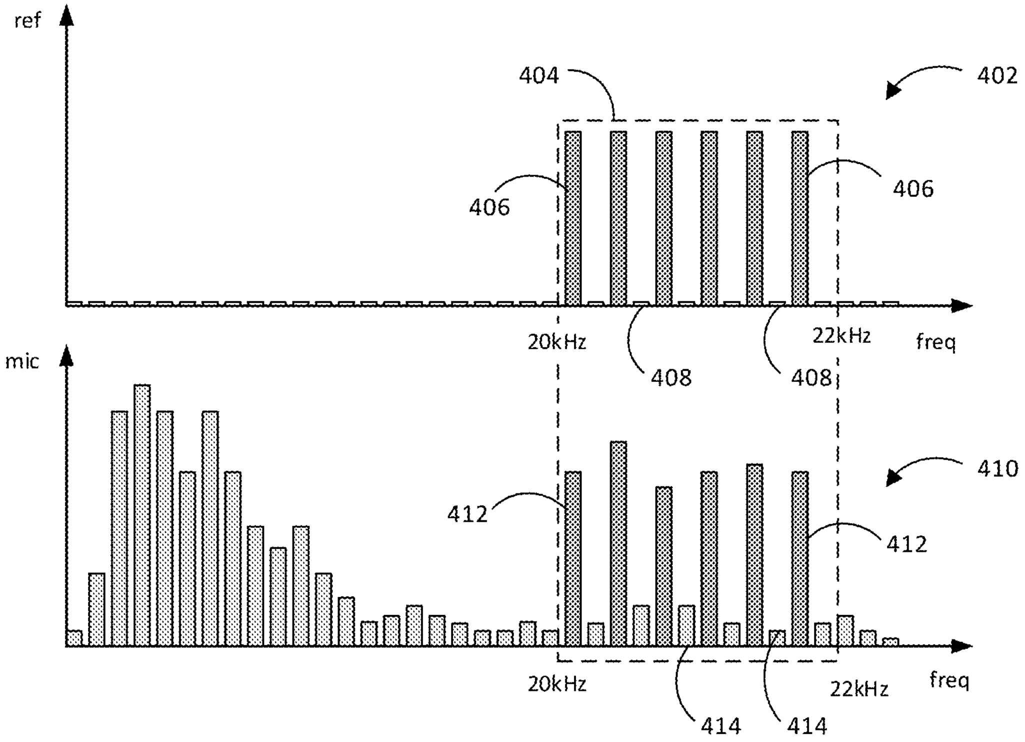
FIG. 5 shows an example FFT magnitude plot of a reference signal and detected signal generated and received by the audio playback system of FIG. 4 or the method of FIG. 1.

FIG. 5 shows the FFT magnitude spectrum 400 of an example reference signal 402 and the received (microphone) signal 410. In the generated reference signal, there are six active bins 406, each of which is followed by a zero-bin 408. The active bins 406 have equal amplitude in this case, although this is not necessary, and all other bins 408 have zero-amplitudes. The analysis region 404 is represented by the dashed rectangle. An example analysis region is in the range 20 kHz to 22 kHz, as this is outside the human hearing range, and can still be generated in signals using traditional audio sampling rates of 44.1 kHz and 48 kHz. The corresponding active bins 412 and zero-bins 414 for the received signal may include ambient and other noise components.

Figure 6:
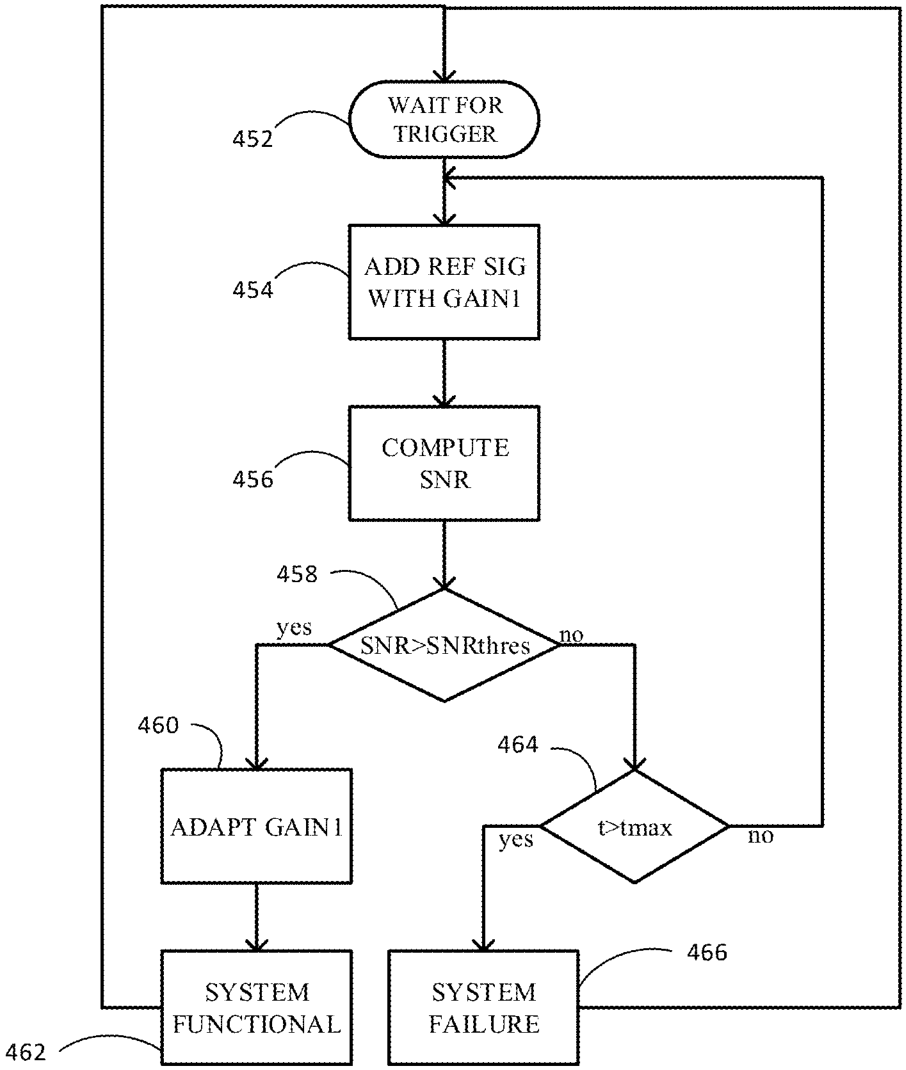
FIG. 6 Illustrates a method of operation of the audio playback system of FIG. 4.

In some examples, the audio play back system 300 may evaluate the generated signal within a predetermined time frame to determine whether there is a fault. This is illustrated for example in FIG. 6 which shows a method of detecting a fault 450 in audio playback system 300. In step 452 after a trigger, which is given every time period denoted $t_{max}$, an internal memory buffer (B) may be reset. In step 454, the generated reference signal may be multiplied by a gain value gain1 and added to the audio signal. After N+Δk samples, where Δk is the system delay, a number (N) received samples may be added to internal buffer B. In step 456, the buffer may be analysed by the analyser 306, which determines an SNR value for the reference signal. In step 458, the method may determine whether the SNR value exceeds a user-defined threshold ($SNR_{thres}$). If $SNR_{thresh}$ is exceeded the method may adapt the gain in step 460. In some examples, the gain can be adapted in the following manner: if the time since the last trigger, t, is smaller than a given threshold, $t_{thres}$, the gain can be decreased, otherwise the gain can be increased. In some examples, if the reference signal is detected in the microphone signal significantly before $t_{thres}$, only few averages are required, and so the gain may be lowered slightly. However, if many averages are required, the expected SNR at the next analysis cycle can be increased by increasing the gain gain1 in step 454.

Following from step 460 in step 462 the system is indicated to be functional. The method may then return to step 452.

Returning to step 456, a number of received samples may be added to internal buffer B. In step 458, if the $SNR_{thresh}$ is not exceeded, the method proceeds to step 464 and determines whether the maximum time period $t_{max}$ has been exceeded. If $t_{max}$ is exceeded then the method proceeds to step 466 and a system failure is indicated. If $t_{max}$ is not exceeded the playback of the reference signal continues and the method returns to step 452.

Figure 7:
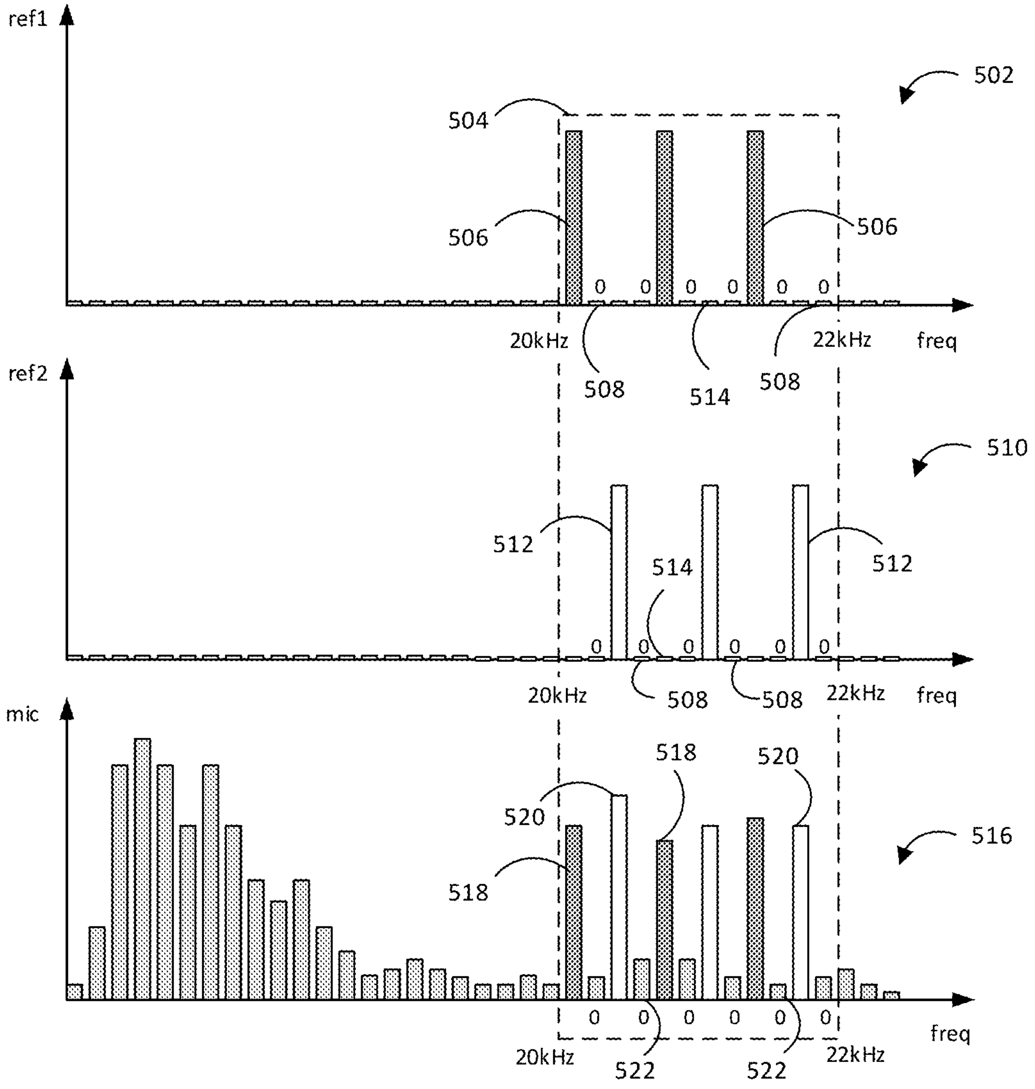
FIG. 7 shows an example FFT magnitude plot of multiple reference signals and detected signal generated and received by the audio playback system of FIG. 4 or the method of FIG. 1.

In some examples an audio playback system may include multiple loudspeakers which may need to be checked. In this case, the reference signal can be designed differently such that each loudspeaker has its own distinct set of active bins. When the loudspeakers play their proper reference signals, a single microphone may record the acoustical outputs. The signal spectra for two loudspeakers 500 is illustrated in FIG. 7. The top graph 502 and middle graph 510 show the FFT magnitude spectra of the two reference signals denoted ref1 and ref2, and the bottom graph 516 shows the FFT magnitude spectra of the received audio signal. The analysis region 504 is represented by the dashed rectangle. In this case, each reference signal contains three active bins 506, 512, and zero-bins 508. A zero-bin in this case is defined as a frequency bin that is zero in all reference signals (i.e., both signals ref1 and ref2) as illustrated and indicated with a '0' above the bin. The magnitudes of the bins 514 that are not active in the current reference signal, but active in another reference signal, are set to zero for the respective signals ref 1 and ref 2 shown in the graphs 502, 510. In the received audio (microphone) signal, there are two sets of active bins. First active bins 518 originating from the first loudspeaker, and second active bins 520 originating from the second loudspeaker. The analysis can be performed for the presence of each reference signal separately. An example SNR criterion for loudspeaker 1 is $$SNR_l = 10\log_{10}\frac{N_Z\sum_{i\in A_l}|X_i|^2}{N_{A_l}\sum_{j\in Z}|X_j|^2} \quad (2)$$

The set of zero-bins, Z, is common for all reference signals.

The detection of the reference signal does not use a cross-correlation, which is the usual way of detecting the presence of a signal. Detecting a reference signal as described may give a more accurate presence detection than cross-correlation since both a poor signal correlation and a low signal-to-noise ratio would lead to lower correlation values. The acoustical path between loudspeaker and microphone may also influence the correlation value.

The audio system may have multiple microphones. In that case, presence level criteria may be computed for each received signal (one from each microphone), and a decision for pass/fail can be made if at least one of the received signals meets the criterion.

In general, embodiments described can be used for monitoring an actuator/sensor system where the actuator can be used for generating actions that can be measured by the sensor, but not perceived by the user. In some examples the method may be applied for haptic systems.

There is disclosed an audio playback system including a loudspeaker, a microphone and a means for implementing a method of detecting a fault which includes the generation and analysis of a specific ultrasound reference signal. The presence of the ultrasound reference signal can be detected on the microphone signal, and the signal-to-noise ratio can be estimated during the reference signal playback so that the volume of the reference signal can be adapted if necessary. The reference signal is a multi-sinusoidal signal which, when averaged over time increases the expected signal-to-noise ratio, and hence, the sensitivity of the detector.

Apparatus and methods described herein allow for a detection of the reference signal in the microphone signal, and an estimation of the signal-to-noise ratio during the playback of the reference signal without requiring a separate silent segment for measuring the noise level. Embodiments may be included in systems that require continuous and inaudible monitoring of audio systems. This may be used for example in automotive safety-critical systems, where the audio is used to notify the user in case of a system failure. The audio system used for sending this notification may diagnose its own system failure, preferably before attempting to send out the notification to the user, since user notifications are often time-critical in these applications.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums.

Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data-based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of detecting a fault in an audio playback system, the method comprising:

- generating a reference signal comprising a plurality of sinusoidal waveforms with frequencies in the ultrasound region for output via the audio playback system as a non-audible reference signal;
- receiving an audio signal via at least one sensor;
- determining a signal-to-noise ratio value based on the received audio signal;
- determining a presence level of the reference signal in the received audio signal based on the signal-to-noise ratio value;
- adjusting a gain of a subsequently generated reference signal based on the signal-to-noise ratio value; and
- outputting a fault indication dependent on the presence level.

2. The method of claim 1, further comprising outputting fault indication in response to the reference signal not being present in the received audio signal.

3. The method of claim 2, wherein the amplitude of the generated reference signal is varied as a function of the presence level.

4. The method of claim 3, wherein the amplitude of the generated reference signal increases if the presence level is below a first threshold value, and wherein the amplitude of the generated reference signal decreases if the presence level is above one of the first threshold value and a second threshold value.

5. The method of claim 1, wherein each waveform of the plurality of sinusoidal waveforms has a frequency in a range of 19 KHz to 96 KHz.

6. The method of claim 1, wherein determining the presence level of the reference signal in the received audio signal includes determining the signal-to-noise ratio value of the received audio signal and comparing the signal-to-noise ratio value to a threshold value.

7. The method of claim 1, wherein generating the reference signal includes repeating an N-samples segment, the generation of the N-samples segment comprising the steps of:

- defining a set of frequency bins between a first and second ultrasound frequency;
- defining a magnitude spectrum of length N/2+1, the magnitude spectrum comprising a plurality of active bins having a magnitude greater than zero and a plurality of zero-bins having a magnitude equal to zero;
- converting the magnitude spectrum to a complex-valued spectrum by adding a phase value to each magnitude value of the active bins; and
- generating the N-samples segment of the reference signal by applying an N-points inverse fast Fourier transform (iFFT) to the complex-valued spectrum.

8. The method of claim 7, wherein determining the presence level of the reference signal in the received signal comprises the steps of:

- determining the fast Fourier transform (FFT) of an N-samples segment of the received signal; and
- determining the signal-to-noise ratio value from a ratio of signal power of the active bins and signal power of the zero-bins.

9. The method of claim 8, wherein generating the N-samples segment of the received signal comprises the steps of:

- dividing the received signal into segments of N consecutive samples; and
- averaging across the segments to obtain an N-samples segment.

10. The method of claim 1, wherein the amplitudes of the plurality of sinusoidal waveforms are approximately equal.

11. The method of claim 10, further comprising mixing the reference signal with a further audio signal for output via a loudspeaker of the audio playback system.

12. A non-transitory computer readable media comprising a computer program comprising computer-executable instructions which, when executed by a computer, causes the computer to perform a method of detecting a fault in an audio playback system, the method comprising:

- generating a reference signal comprising a plurality of sinusoidal waveforms with frequencies in the ultrasound region for output via the audio playback system as a non-audible reference signal;
- receiving an audio signal via at least one sensor;

determining a signal-to-noise ratio value based on the received audio signal;

determining a presence level of the reference signal in the received audio signal based on the signal-to-noise ratio value;

adjusting a gain of a subsequently generated reference signal based on the signal-to-noise ratio value; and outputting a fault indication dependent on the presence level.

13. An audio playback system comprising:

a reference signal generator having a reference signal output configured to be coupled to a loudspeaker;

an audio analyser having an audio analyser input configured to be coupled to an acoustic sensor and an audio analyser output; wherein the reference signal generator is configured to output a reference signal comprising a plurality of sinusoidal waveforms in ultrasound frequency range for output via the loudspeaker; and the audio analyser is configured to:

receive an audio input signal;

determining a signal-to-noise ratio value based on the received audio signal;

determine a presence level of the reference signal in the received audio input signal based on the signal-to-noise ratio value;

adjust a gain of a subsequently generated reference signal based on the signal-to-noise ratio value; and output a fault indication dependent on the presence level.

14. The audio playback system of claim 13, wherein the audio analyser is further configured to determine the presence level of the reference signal in the received audio signal by determining a first signal-to-noise ratio value of the reference signal for a first sample segment.

15. The audio playback system of claim 14, wherein the audio analyser is further configured to determine the presence level of the reference signal by determining a second signal-to-noise ratio value of the reference signal from a further sample segment and determining an average signal-to-noise ratio value from the first signal-to-noise ratio value and the second signal-to-noise ratio value.

16. The audio playback system of claim 15, wherein the reference signal generator is configured to generate the reference signal by repeating an N-samples segment, and to generate the N-samples segment by:

defining a set of frequency bins between a first and second ultrasound frequency;

defining a magnitude spectrum of length N/2+1, the magnitude spectrum comprising a plurality of active bins having a magnitude greater than zero and a plurality of zero bins having a magnitude equal to zero;

converting the magnitude spectrum to a complex-valued spectrum by adding a phase value to each magnitude value of the active bins; and generating the N-samples segment of the reference signal by applying an N-points inverse fast Fourier transform (iFFT) to the complex-valued spectrum.

17. The audio playback system of claim 16, wherein the audio analyser is configured to determine the presence level of the reference signal by:

determining the fast Fourier transform (FFT) of an N-samples segment of the received signal; and determining the signal-to-noise ratio value from a ratio of signal power of the active bins and signal power of the zero-bins.

18. The audio playback system of claim 17, wherein the audio analyser is further configured to generate the N-samples segment of the received signal by:

dividing the received signal into segments of N consecutive samples; and averaging across the segments to obtain an N-samples segment.

* * * * *